E. H. MESSITER.
BELT CONVEYER PULLEY.
APPLICATION FILED APR. 4, 1910.
987,157.
Patented Mar. 21, 1911.
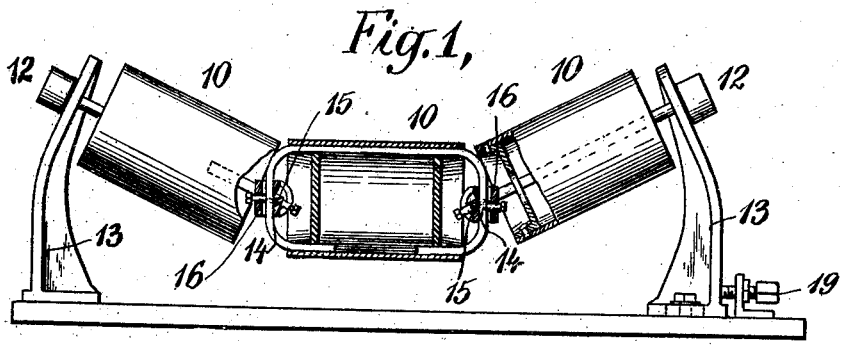
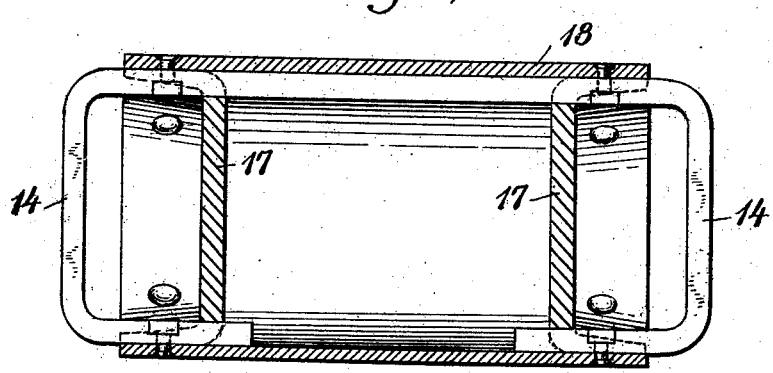
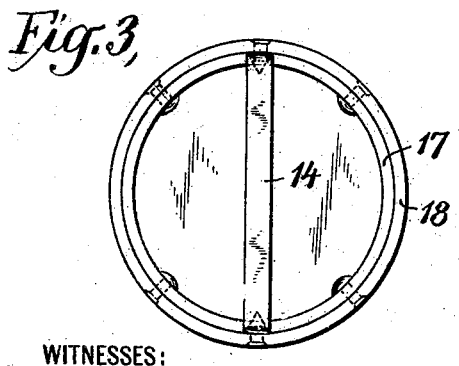
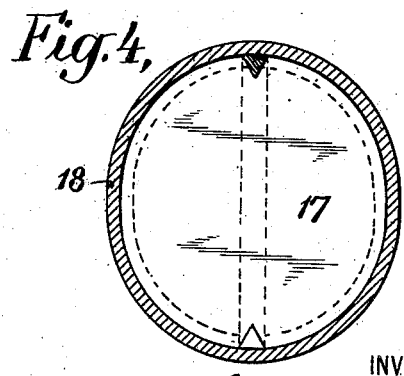

UNITED STATES PATENT OFFICE.

EDWIN H. MESSITER, OF BROOKLYN, NEW YORK.

BELT-CONVEYER PULLEY.

987,157.

Specification of Letters Patent.

Patented Mar. 21, 1911.

Application filed April 4, 1910. Serial No. 553,341.

*To all whom it may concern:*

Be it known that I, EDWIN H. MESSITER, a citizen of the United States of America, and a resident of Brooklyn, county of Kings, and State of New York, have invented certain new and useful Improvements in Belt-Conveyer Pulleys, of which the following is a specification, reference being had to the accompanying drawings, forming a part thereof.

My invention relates to improvements in idler pulleys for conveyer belts, and particularly to that class of such idler pulleys comprising a plurality of suspensively supported pulley members connected together by universal joints.

The rotatable elements of universal joints which are pivotally connected to rock about axes at right angles to each other, and which intersect at a point coincident with the intersection of the axes of the said elements, do not have synchronous movements of rotation, but, on the contrary, the relative angular velocity thereof alternately increases and decreases, so that the members constantly advance and recede with respect to each other. When such a joint is employed to connect pulley members of circular contour, it follows that the surface speeds of the pulley members will constantly vary with respect to each other, but this is undesirable to a high degree for it results in badly wearing both the belt and the joint.

The main object of my present invention is to overcome this defect and to so construct an idler pulley of this description that the surface speeds of its members will not relatively vary. I attain this object by constructing one or both of a pair of connected pulley elements in form other than of circular contours, the diameter decreasing proportionately to the relative increase of speed at any given point, and increasing as the speed decreases. Idler pulleys of this description comprise two or more elements, usually three or five, but in any set each pair of contiguous elements may be considered as a pair independently of the others, and for convenience of description they will be so considered herein. In such a pair one of the pulley members may have a periphery bounded at any point by a circle and the other a periphery of a varying diameter, or the difference may be divided between them, both having a varying diameter, the one increasing as the other decreases and vice versa.

My invention also consists in certain novel details of construction and combinations of parts including a novel construction of the pulley members, and a means for adjusting one of the supporting elements for the pulley toward and away from the other to vary the depth of trough formed by the pulley.

To the end that my invention may be fully understood, I will now proceed to describe an embodiment thereof, having reference to the accompanying drawings illustrating the same, and will then point out the novel features in claims.

In the drawings: Figure 1 is a view in part side elevation and part central longitudinal section of an idler pulley for conveyer belts constructed in accordance with my invention. Fig. 2 is a detail view in central longitudinal section through one of the pulley members. Fig. 3 is an end view of a pulley member having its peripheral contour circular in cross section. Fig. 4 is a transverse sectional view of a pulley member having its peripheral contour oval in cross section.

The idler pulley illustrated comprises three rotatable pulley members 10 connected together by universal joints, and suspensively supported at their ends by end thrust bearings 12 carried by standards 13. The universal joints each comprise knife edge bearing elements 14—15 secured respectively to the pulley members to be connected, the said knife edge bearing portions being disposed transversely and in hooked relation with each other, their bearing edges being in substantial engagement at a point coincident with the point of intersection of the axes of rotation of the pulley members. The knife edge portions are engaged respectively by bearing surfaces oppositely disposed upon a floating bearing block 16, whereby the said bearing block may rock freely with respect to each of the knife edge portions in a direction transverse with respect thereto, but is held against movement in the longitudinal plane thereof. This particular form of universal joint is not claimed herein *per se* as it forms the subject matter of a separate copending application filed April 4, 1910, Serial No. 553,342, but it is illustrated as exemplifying a type of universal joint having pivotal movements in two directions about a common point, any form of which results in varying angular velocities of the connected members. The variation of such relative angular velocity is dependent upon the intersecting angle of the axes of rotation of the connected elements, and in general may be said in its limits to be proportional to the sine of such angle and inversely proportionate to the cosine thereof. The variation is, of course, due to the difference of leverage resulting from the various angles formed between the axes of the pivots and the axes of rotation of the members, as the joint carrying the pivotal axes rotates. In carrying out my invention I vary the diameter of one or both of the pair of connected pulley members to compensate for the varying relative angular velocity thus resulting, whereby an equal surface speed of the two members will result. In Fig. 3 I have shown in end view a pulley whose periphery is represented at any point by a circle, while in Fig. 4 I have shown in transverse section a pulley whose diameter is greater in one direction than in the other. The difference may, of course, be divided between the two pulleys if preferred, and I preferably divide the difference in this way so that both pulleys are other than circular, the larger diameter of the one pulley being transversely disposed with respect to the other to correspond with the transverse disposition of the two rocking elements of the universal joint. One reason for preferring to divide this difference between the two pulleys is that the irregular movement given to the belt by reason thereof is advantageous in many cases, having the effect of jarring the material carried by the belt toward the center thereof, and maintaining an even and proper distribution of the material.

As pulleys whose peripheries are not circular are somewhat difficult to make, I have devised a special construction therefor as follows: I provide end heads 17 of the proper configuration, and then draw a tubular shell 18 thereover, the said tubular shell being forced to take the shape of the said end heads. To provide for the universal joint connection I then take a strip of metal substantially triangular in cross section, and bend it to the form shown in Fig. 2. I insert this in place between the heads and the shell, the heads having cut-away portions to receive the said strip, and I then rivet the strips, head, and shell together. Prior to finally connecting the parts I loop or hook the bent ends of the strip of one pulley member over the corresponding strip of the other pulley member, and finally I mount the bearing blocks 16 in place.

The foregoing constitutes a simple, inexpensive, strong, and durable form of pulley member and universal joint connection, and one which, because of the rocking support between the universal joint members, is subjected to practically no wear at such point.

For the purpose of varying the depth of the trough formed by the pulley as a whole, I provide for the adjustment of one or both of the standards 13 toward and away from each other. One means for effecting this is shown at 19 in Fig. 1, the same comprising an adjusting screw which may be operated when the holding bolts for the standard are freed, the standard being, of course, provided with slotted holes to permit of limited movements of adjustment.

What I claim is:

1. The combination of two pulley members arranged end to end, axially at an angle to each other, and connected to rotate at relatively varying angular velocities, the diameters whereof are varied relatively to compensate therefor, whereby the surface speeds thereof will be substantially equal.

2. The combination of two pulley members arranged end to end, axially at an angle to each other, and connected to rotate at alternately increasing and decreasing relative angular velocities, the peripheral surfaces of the said pulley members having relatively varying radii to compensate therefor, whereby the surface speeds thereof will be substantially equal.

3. The combination of two rotatable pulley members disposed end to end, and with their axes at an angle to each other, and a universal joint connecting them, the said pulley members having diameters which are relatively varied to compensate for the varying angular velocities produced by the universal joint connections, whereby the surface speeds thereof will be substantially equal.

4. The combination of two rotatable pulley members disposed with their axes at an angle to each other, the peripheral contour of one of the said pulleys being substantially oval in transverse section, and a universal joint connecting the said members together.

5. The combination of two rotatable pulley members disposed with their axes at an angle to each other, the peripheral contour of the said pulleys being substantially oval in transverse section, one pulley member being arranged with its greater diameter substantially in line with the minor diameter of the other said pulley, and a universal joint having two pivotal axes at right angles with respect to each other, connecting them.

6. A conveyer belt idler pulley comprising a plurality of connected members each comprising a tubular shell, and a strap of looped form secured directly to the inner face of the said shell for coengagement with the corresponding strap of another pulley member.

7. A conveyer belt idler pulley comprising a plurality of connected members each comprising a tubular shell, end heads secured thereto, and a strap of looped form, substantially triangular in transverse section, for coengagement with the corresponding strap of another pulley member.

8. A conveyer belt idler pulley comprising a plurality of connected members each comprising a tubular shell, and a strap of looped form substantially triangular in transverse section, for coengagement with the corresponding strap of another pulley member.

EDWIN H. MESSITER.

Witnesses:
D. HOWARD HAYWOOD,
LYMAN S. ANDREWS, Jr.

---

Copies of this patent may be obtained for five cents each, by addressing the "Commissioner of Patents, Washington, D. C."